United States Patent
Kim

[11] Patent Number: 5,870,501
[45] Date of Patent: Feb. 9, 1999

[54] METHOD AND APPARATUS FOR ENCODING A CONTOUR IMAGE IN A VIDEO SIGNAL

[75] Inventor: Jin-Hun Kim, Seoul, Rep. of Korea

[73] Assignee: Daewoo Electronics, Co., Ltd., Seoul, Rep. of Korea

[21] Appl. No.: 721,638

[22] Filed: Sep. 26, 1996

[30]  Foreign Application Priority Data

Jul. 11, 1996 [KR] Rep. of Korea .................. 1996 27949

[51] Int. Cl.[6] ........................................................ G06K 9/36
[52] U.S. Cl. ......................... 382/241; 382/242; 382/236; 382/238; 348/416; 348/413
[58] Field of Search .................................... 382/236, 238, 382/241, 242, 232; 348/416, 413, 400, 394

[56] References Cited

U.S. PATENT DOCUMENTS

| | | | |
|---|---|---|---|
| 4,951,140 | 8/1990 | Ueno et al. ............................. | 348/413 |
| 5,594,504 | 1/1997 | Ebrahimi ................................. | 348/416 |
| 5,612,744 | 3/1997 | Lee et al. ................................. | 348/416 |
| 5,623,310 | 4/1997 | Kim ......................................... | 348/394 |
| 5,633,685 | 5/1997 | Cho et al. ............................... | 382/242 |
| 5,638,986 | 6/1997 | Kim ......................................... | 382/242 |

FOREIGN PATENT DOCUMENTS 2296839  7/1996  United Kingdom ............. H04N 5/14

*Primary Examiner*—Josel L. Couso
*Assistant Examiner*—Anh Hong Do
*Attorney, Agent, or Firm*—Pennie & Edmonds LLP

[57] ABSTRACT

A contour image coding method divides a video frame into a multiplicity of blocks and detects contour blocks and determines a plurality of vertices on each contour segment included in each contour block and codes the contour image based on the vertices on each contour segment for each contour block.

6 Claims, 3 Drawing Sheets

METHOD AND APPARATUS FOR ENCODING A CONTOUR IMAGE IN A VIDEO SIGNAL

FIELD OF THE INVENTION

The present invention relates to a method and an apparatus for encoding a contour image in a video signal; and, more particularly, to an improved contour encoding method and apparatus capable of reducing the computational complexity in approximating the contour image.

DESCRIPTION OF THE PRIOR ART

In digital video systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is necessary to compress or reduce the volume of data by using various data compression techniques, especially, in the case of such low bit-rate video signal encoders as video-telephone and teleconference systems.

One of such techniques for encoding video signals for a low bit-rate encoding system is the so-called object-oriented analysis-synthesis coding technique(see, Michael Hötter, "Object-Oriented Analysis-Synthesis Coding Based on Moving Two-Dimensional Objects", *Signal Processing: Image Communication*, 2, No.4, pp.409–428 (December, 1990)).

According to the object-oriented analysis-synthesis coding technique, an input video image is divided into objects; and three sets of parameters for defining the motion, contour and pixel data of each object are processed through different encoding channels.

Specifically, in processing a contour image of an object, the contour information is important for the analysis and synthesis of an object shape. A classical coding method for representing contour information is a chain coding technique. Although the contour information is faithfully coded without any loss thereof by employing the chain coding technique, it requires a substantial amount of data for the representation thereof.

In this regard, there have been proposed several techniques to approximate a contour such as polygonal approximation and B-spline approximation. One of the disadvantages in the polygonal approximation is the roughness of the representation of the contour. The B-spline approximation is, on the other hand, capable of representing the contour more precisely; however, it requires a high-order polynomial to reduce the approximation error, thereby increasing the overall computational complexity of the video encoder.

One of the techniques introduced to ameliorate the problems associated with the roughness of the representation and the overall computational complexity is a contour approximation employing both the polygonal approximation and a discrete sine transform(DST). This technique is described in a commonly owned copending application, U.S. Ser. No. 08/423,604, filed on Apr., 17, 1995 and entitled "A CONTOUR APPROXIMATION APPARATUS FOR REPRESENTING A CONTOUR OF AN OBJECT". However, since the above technique performs the polygonal approximation and the DST of a contour image over a frame, when dealing with a complex contour image, it still remains to be desirable to further reduce the computational complexity of the contour approximation.

SUMMARY OF THE INVENTION

It is, therefore, a primary object of the invention to provide a contour encoding method and apparatus capable of reducing the computational complexity of a contour approximation.

In accordance with the present invention, there is provided a method for encoding a contour image of an object contained in a video frame of a video signal, wherein the contour image includes a plurality of contour pixels, the contour pixels representing pixels located on the contour image, which comprises the steps of:

(a) dividing the video frame into a multiplicity of blocks, each of the blocks including K×L pixels with K and L being positive integers, respectively;

(b) detecting contour blocks, each of the contour blocks including one or more contour pixels therein; and (c) coding the contour image on a contour block-by-contour block basis.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
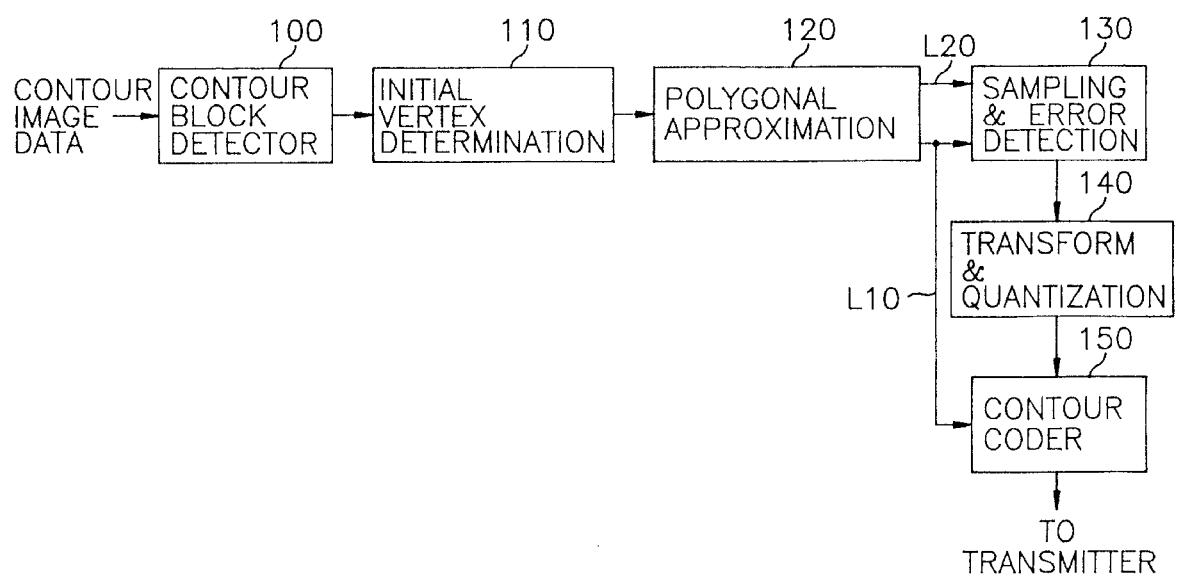
FIG. 1 depicts a block diagram of a contour coding apparatus in accordance with the present invention.

Referring to FIG. 1, there is shown a block diagram of an inventive contour coding apparatus 10 for encoding a contour image of an object included in a video frame of a video signal.

The contour coding apparatus 10 comprises a contour block detector 100, an initial vertex determination block 110, a polygonal approximation block 120, a sampling and error detection block 130, a transform and quantization (DST & Q) block 140 and a contour coder 150.

Contour image data of an object included in a video frame is inputted to the contour block detector 100, wherein the contour image data represents position information of contour pixels, the contour pixels representing pixels located on the contour of the object.

Figure 2:
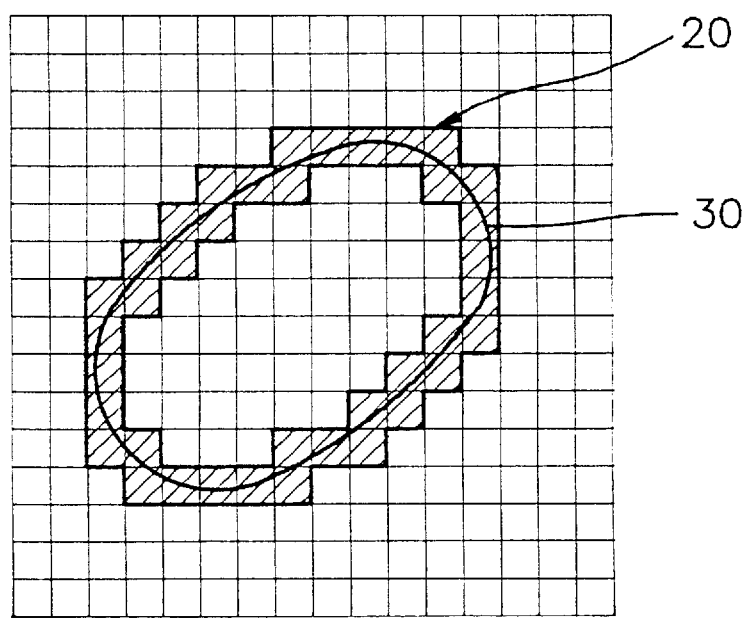
FIG. 2 provides an illustrative diagram for defining contour blocks.

At the contour block detector 100, the video frame is first divided into a plurality of blocks of K×L pixels with K and L being positive integers, respectively, and contour blocks are detected, wherein the contour block denotes a block containing at least one contour pixel. For instance, as shown in FIG. 2, each block located in a shaded region 20 includes a portion of a contour 30 in a video frame 40 and is referred to as a contour block. Position information of contour pixels included within each contour block is then provided to the initial vertex determination block 110.

The initial vertex determination block 110 detects two end points of each contour segment in each contour block and selects the detected two end points as initial vertices for the respective contour segment, wherein a contour segment represents a set of continuous contour pixels within a contour block.

Figure 3:
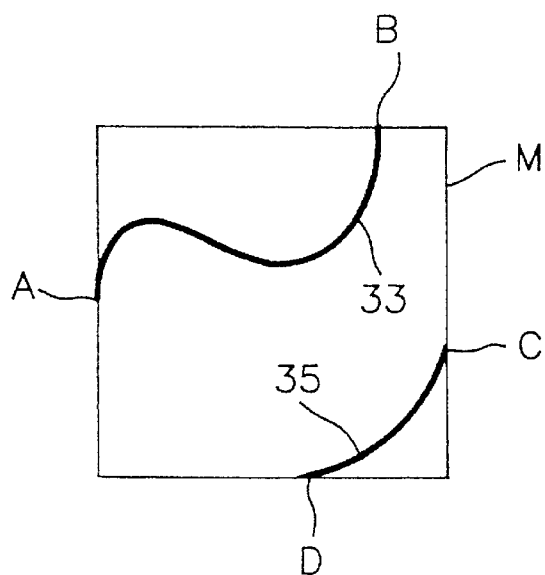
FIG. 3 shows the initial vertices determination process in accordance with the present invention.

Referring to FIG. 3, there are shown diagrams illustrating an initial vertex determination process carried out at the initial vertex determination block 110. As shown in FIG. 3, if there are open loop contour segments 33 and 35 in a contour block M, two end points A and B are determined as initial vertices for the contour segment 33 and two end points C and D are selected as initial vertices for the contour segment 35. If a contour segment in a contour block is of a closed loop, two farthest points on that contour segment are selected as initial vertices as in the conventional polygonal approximation technique. In case a contour segment consists of only one contour pixel, initial vertices are not determined for that contour segment. After determining initial vertices for each contour segment including more than one contour pixel, initial vertex data representing position information of initial vertices for such contour segment and contour segment data representing position data of the contour pixels which constitute the contour segment are transferred to the polygonal approximation block 120.

Based on the initial vertices data and the contour segment data for each contour segment, the polygonal approximation block 120 approximates each contour segment by using a conventional approximation algorithm for fitting the contour segment by line segments.

Figure 4:
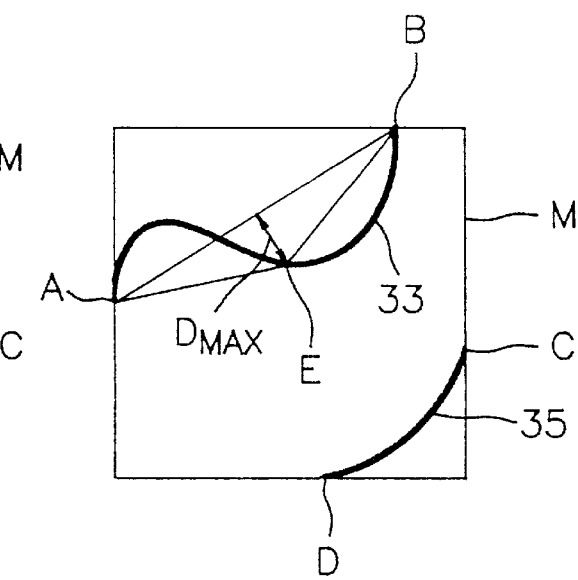
FIG. 4 illustrates an exemplary polygonal approximation process for a contour segment.

Referring to FIG. 4, there is illustrated a segmentation process for the exemplary contour segment 33 according to the polygonal approximation technique.

First, a straight line segment AB between the initial vertices A and B of the contour segment 33 is drawn and a distance $D_{MAX}$ from a farthest point on the contour segment 33 to the straight line segment AB is determined. If the distance $D_{MAX}$ between the straight line segment AB and the farthest point, e.g., E, is greater than a predetermined threshold value, the point E is selected as an additional vertex and straight line segments AE and EB connecting the point E with A and B respectively are drawn. This procedure is repeated until the $D_{MAX}$ for each straight line segment becomes smaller than the predetermined threshold value.

The number of additional vertices depends on the predetermined threshold value and the representation of the contour segment by straight line segments becomes more accurate, at the expense of coding efficiency, as the predetermined threshold value becomes smaller.

Referring back to FIG. 1, the polygonal approximation block 120 provides via a line L10 vertex information representing positions of the vertices including the initial and the additional vertices, e.g., A, B and E, for each contour segment to the sampling & error detection block 130 and the contour coder 150, while contour segment data for each contour segment is fed to the sampling and error detection block 130 through a line L20.

At the sampling & error detection block 130, N equidistanced sample points are selected for each straight line segment between two vertices within a contour segment, N being a positive integer; and an approximation error at each of the N sample points are calculated based on the vertex information and the contour segment data, wherein the approximation error at a sample point represents a distance between a straight line segment and the contour segment at the sample point.

Figure 5:
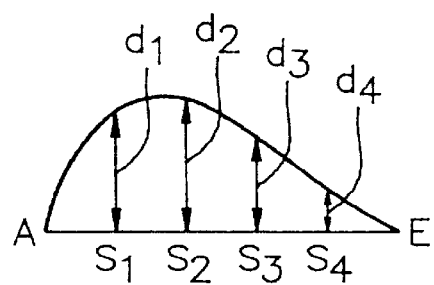
FIG. 5 describes errors at sample points for a line segment representing its corresponding contour segment between two vertices.

FIG. 5 illustrates an exemplary diagram representing approximation errors between straight line segment AE and corresponding contour segment. Each of the approximation errors d1 to d4 represents the distance from each of sample points s1 to s4 on the line segment AE to the corresponding contour segment, wherein the approximation errors at the vertices A and E are all "zeros". In a preferred embodiment of the present invention, each approximation error includes a sign determined in a predetermined manner in order for a decoder in a receiving end to be able to recognize which side of the line segment a portion of the contour segment, i.e., a contour pixel, represented by each approximation error resides. A set of approximation errors for each straight line segment is then applied to the transform and quantization block 140.

The transform and quantization block 140 transforms, first, each set of the approximation errors into a set of transform coefficients by employing, e.g., a discrete sine transform (DST), wherein the approximation errors for each set may include the approximation errors at N sample points and two vertices of each line segment or just the approximation errors at N sample points. And the set of transform coefficients are then quantized by using a known quantization method and a set of the quantized transform coefficients corresponding to each line segment are provided to the contour coder 150 for further processing.

At the contour coder 150, each set of the quantized transform coefficients is encoded, e.g., by using a binary arithmetic code of JPEC(Joint Photographic Experts Group), while the vertex information from the polygonal approximation block 120 is encoded by using, e.g., a fixed length code without compression since the vertices are sparsely correlated. The encoded digital signals comprising the encoded quantized transform coefficients and vertex information are transmitted to a transmitter for the transmission thereof.

While the present invention has been described with reference to the particular embodiments, it will be apparent to those skilled in the art that various changes and modifications may be made without departing from the spirit and scope of the invention as defined in the following claim.

What is claimed is:

1. A method for encoding a contour image of an object contained in a video frame of a video signal, wherein the contour image includes a plurality of contour pixels, the contour pixels representing pixels located on the contour image, comprising the steps of:

(a) dividing the video frame into a multiplicity of blocks, each of the blocks including K×L pixels with K and L being positive integers, respectively;

(b) detecting contour blocks, each of the contour blocks including one or more contour pixels therein; and (c) coding the contour image on a contour block-by-contour block basis; wherein said step (c) includes the steps of:

(c1) determining a plurality of vertices on each contour segment included in each contour block, said each contour segment representing a set of continuous contour pixels included in said each contour block;

wherein said step (c1) contains the steps of:

(c11) determining two vertices on each contour segment, wherein two end points of said each contour segment are selected as said two determined vertices if said each contour segment is of an open loop; and (c12) finding additional vertices on each contour segment until a maximum distance between said each contour segment and a straight line segment connecting two adjacent vertices on said each contour segment becomes smaller than a predetermined threshold value; and (c2) coding the contour image based on the vertices on said each contour segment; wherein said step (c2) contains the steps of:

(c21) determining a predetermined number of sample points on a straight line segment joining two adjacent vertices on each contour segment;

(c22) calculating an error at each of the sample points and the vertices on each straight line segment, the error representing a distance between the straight line segment and its corresponding contour segment;

(c23) transforming a set of errors into a set of transform coefficients;

(c24) converting the set of transform coefficients into a set of quantized transform coefficients; and (c25) coding the set of quantized transform coefficients.

2. The method in accordance with claim 1, wherein the set of errors includes the errors of the sample points on each straight line segment.

3. The method in accordance with claim 1, wherein the set of errors includes the errors of the sample points and the vertices on each straight line segment.

4. An apparatus for encoding a contour image of an object contained in a video frame of a video signal, wherein the contour image includes a plurality of contour pixels, the contour pixels representing pixels located on the contour image, which comprises:

means for dividing the video frame into a multiplicity of blocks, each of the blocks including K×L pixels with K and L being positive integers, respectively;

means for detecting contour blocks from said multiplicity of blocks, each of the contour blocks including one or more contour pixels therein; and means for coding the contour image on a contour block-by-contour block basis;

wherein said contour image coding means includes:

means for determining a plurality of vertices on each contour segment included in each contour block, said each contour segment representing a set of continuous contour pixels included in each contour block; and wherein said vertices determining means includes:

means for determining two vertices on each contour segment, wherein two end points of said each contour segment are selected as said determined two vertices if said each contour segment is of an open loop; and means for finding additional vertices on each contour segment until a maximum distance between said each contour segment and each straight line segment connecting two adjacent vertices on said each contour segment becomes smaller than a predetermined threshold value; and means for coding the contour image based on the vertices on said each contour segment;

wherein said contour image coding means includes:

means for determining a predetermined number of sample points on each straight line segment joining two adjacent vertices on said each contour segment;

means for calculating an error at each of the sample points and the vertices on each straight line segment, the error representing a distance between the straight line segment and its corresponding contour segment;

means for transforming a set of errors into a set of transform coefficients;

means for converting the set of transform coefficients into a set of quantized transform coefficients; and means for coding the set of quantized transform coefficients.

5. The apparatus in accordance with claim 4, wherein the set of errors includes the errors of the sample points on each straight line segment.

6. The apparatus in accordance with claim 4, wherein the set of errors includes the errors of the sample points and the vertices on each straight line segment.

* * * * *